H. M. P. MURPHY.
GOVERNOR FOR AIR COMPRESSORS.
APPLICATION FILED MAR. 21, 1908.
988,648.
Patented Apr. 4, 1911.
2 SHEETS—SHEET 1.
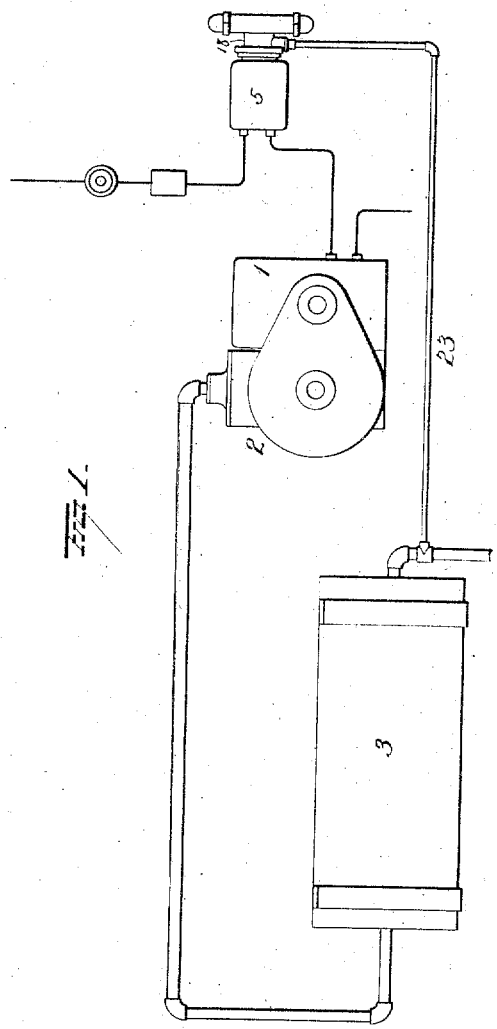

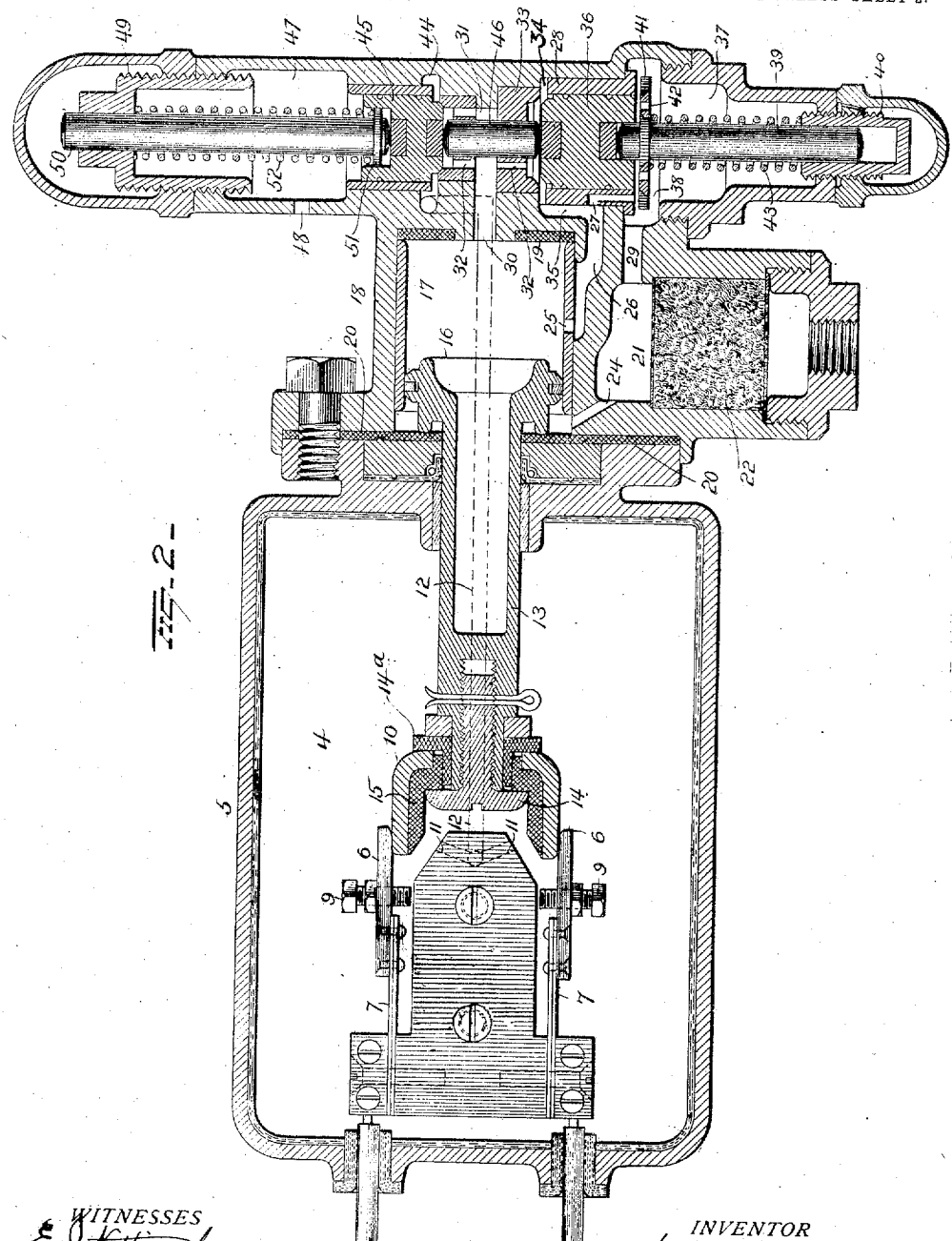

UNITED STATES PATENT OFFICE.

HOWARD M. P. MURPHY, OF PITTSBURG, PENNSYLVANIA, ASSIGNOR, BY DIRECT AND MESNE ASSIGNMENTS, TO THE WESTINGHOUSE AIR BRAKE COMPANY, OF PITTSBURG, PENNSYLVANIA, A CORPORATION OF PENNSYLVANIA.

GOVERNOR FOR AIR-COMPRESSORS.

988,648.  Specification of Letters Patent.  Patented Apr. 4, 1911.

Application filed March 21, 1908. Serial No. 422,534.

*To all whom it may concern:*

Be it known that I, HOWARD M. P. MURPHY, a resident of Pittsburg, in the county of Allegheny and State of Pennsylvania, have invented certain new and useful Improvements in Governors for Air-Compressors; and I do hereby declare the following to be a full, clear, and exact description of the invention, such as will enable others skilled in the art to which it appertains to make and use the same.

This invention relates to improvements in governors for pumps or compressors, and particularly to such as are adaptable for use in air brake systems for charging the reservoirs which supply air under pressure for actuating and controlling the various instrumentalities by means of which the brakes are applied and released.

The object of my present invention is to provide simple and efficient means, controlled by fluid pressure in a storage reservoir, for controlling the operation of the pump which supplies said storage reservoir.

A further object is to so construct the governor that it will operate automatically to stop the operation of the pump which supplies the storage reservoir when the pressure in the latter reaches a predetermined degree, and so that said governor will also operate to automatically effect the starting of the pump when the pressure in the storage reservoir drops to some lower and predetermined degree.

A further object is to so construct a governor of the type to which my invention relates, that it will operate automatically and effectually, under control of fluid pressure in a storage reservoir, to effect the maintenance of the storage reservoir pressure within predetermined limits which are adjustable independently of each other.

With these and other objects in view the invention consists in certain novel features of construction and combinations of parts as hereinafter set forth and pointed out in the claims.

In the accompanying drawings; Figure 1 is a diagrammatic view illustrating an air compressor equipment for an air brake system with my improvement applied thereto, and Fig. 2 a sectional view illustrating the governor.

In the drawings, I have shown my improvements adapted to control the operation of an electric motor 1, by means of which the pump or compressor 2 is actuated to supply or charge a main reservoir or storage reservoir 3. It will be understood however that my improvements may be adapted to control any other type of propelling means for the pump or compressor.

The motor 2 is included in a circuit from any convenient source of electrical energy, and also included in this circuit, is a switch 4. This switch is inclosed within a casing 5, and comprises in its structure, two contact fingers 6, supported, through the medium of spring arms 7, by a block of suitable insulating material 8 suitably secured to the casing 5. The contact fingers 6 may be maintained, by means of adjustable screws 9, in proper position to insure the entrance between them of a switch member 10 for closing the electrical circuit which includes the pump motor. The insulating block 8 is provided with lateral ducts 11 which receive air through a duct 12 from a source hereinafter explained, and the air escaping from the lateral ducts 11 will serve to extinguish any arc which might occur when the switch member 10 is moved from between the contact fingers 6 to open the motor circuit.

The switch member 10 above referred to, is preferably made in the form of a metallic cup carried by a rod 13. The cup or switch member 10 may be conveniently secured to the rod 13 by means of a headed screw 14 made to enter a threaded socket in the end of said rod,—the cup 10 being suitably insulated from the head of the screw and from the end of the rod 13 by means of fiber or other bushings 14ª 15.

The rod 13 passes through one end of the switch casing 5 and through suitable packing glands, and is provided at its free end with a piston 16 disposed within a cylindrical chamber 17 in a casing 18, the latter being securely bolted to the casing 5. The chamber 16 is provided at its respective ends with seats or abutments 19, 20 to receive the piston 16 when the latter reaches one or the other end of its throw. The casing 18 is also provided with a chamber 21, in which a filter 22 may be located, and this chamber is adapted to contain fluid under the main reservoir pressure, received from said main reservoir through a pipe 23. A duct 24 conveys fluid under main reservoir or supply pressure from the chamber 21 to the chamber 17 at the side of the piston 16 with which the rod 13 is connected. This side of the piston is therefore constantly exposed to main reservoir pressure, but the full area of said piston is not subject to main reservoir pressure, as the transverse area of the stem or piston rod 13 is exposed to atmospheric pressure within the switch casing 5 wherein atmospheric pressure exists at all times. The entire surface of the other side of the piston 16 is exposed (when the parts are in the positions shown in Fig. 2, with the switch 4 closed) to fluid under main reservoir pressure, the fluid entering the chamber 17 through a port 25 from a duct 26, and main reservoir fluid reaches the duct 26 through a small duct 27 in a sleeve 28, the duct 27 in turn communicating with a duct 29 from the chamber 21. Thus it will be seen that when the piston 16 is exposed to main reservoir pressure on both of its faces, the same will be moved toward the switch casing because the area of the piston 16 corresponding with the transverse sectional area of the piston rod 13 is exposed to atmospheric pressure only, and the movable switch member or cup 10 will be forced up between the contact fingers 6 as shown in Fig. 2, thus closing the circuit of the pump motor. The pump will now operate to raise the pressure in the main reservoir and when said pressure shall have reached a predetermined degree, the piston 16 will be caused (through the operation of instrumentalities hereinafter described) to move toward the opposite end of the chamber 17 and open the switch 4 and consequently stop the operation of the pump.

It is obvious that when the piston 16 is moved from the position shown in Fig. 2, to the opposite end of the chamber 17, the port 25 will be cut off from the portion of chamber 17 in front of said piston,—hence the necessity for means, other than the port 25 and duct 26, for enabling fluid under main reservoir pressure to reach the forward face of the piston 16. Thus, fluid under main reservoir pressure may enter the forward end of the chamber 17 by a duct 30. This duct communicates with a chamber 31, and the latter receives fluid through a small duct 32 in a valve seat 33, from a chamber 34, the latter communicating with a duct 35 which constitutes an extension of the duct 26. Thus fluid under main reservoir pressure may pass from the duct 26 by way of ducts 35,—32 and 30 to the chamber 17 in front of the piston 16.

A valve 36 is located in the sleeve 28 and operates, under certain conditions, to close communication between the ducts 32 and 35. Below this valve, a chamber 37 is located and is in constant communication at 38 with the main reservoir pressure chamber 21. A rod 39 passes through the chamber 37 and at its lower end is guided by a tubular, adjustable nut 40. The upper end of the rod 39 engages the valve 36, and a short distance below its upper end, said rod carries a disk 41 having holes 42,—through which latter fluid under main reservoir pressure can reach the valve 36 from the chamber 37 when the disk is seated against the lower end of the sleeve 28.

A spring 43 encircles the rod 39 and bears at its respective ends against the disk 41 and nut 40,—by means of which latter, the tension of said spring can be adjusted. With the parts in the position shown in Fig. 2, the distance between the valve 36 and its seat 33 is slightly greater than the distance between the disk 41 and the lower end of sleeve 28. Thus, when the rod 39 and disk 41 are moved upwardly, the disk will operate to close the duct 27 before the valve 36 reaches its seat, but, by reason of the holes 42 in said disk, the valve 36 will be closed to become seated by the action of fluid under main reservoir pressure in the chamber 37.

The chamber 31 hereinbefore referred to, is adapted to communicate with a chamber 44, but this communication is closed when the parts are in the position shown in Fig. 2, by a valve 45. The chamber 44 communicates with one end of the duct or pipe 12, the other end of which latter communicates with the lateral ducts 11 as hereinbefore explained. It will be seen therefore, that when the valve 45 is open, the chamber 44 and hence the ducts connecting this chamber with the chamber 17 (which latter may be conveniently termed a "controlling chamber") will be open to the atmosphere through the pipe or duct 12. A rod 46 is disposed between the valves 36 and 45 and has a bearing against each of them, so that a movement of one of said valves will be transmitted to the other.

A chamber 47 is located above the valve 45 and is open to the atmosphere through a vent 48. An adjustable nut 49, having a socket, is located at the upper end of the chamber 47, and through this nut, a rod 50 has free movement. The lower end of the rod 50 bears upon the valve 45, and adjacent to its bearing on the valve 45, said rod is provided with a flange or collar 51. A spring 52 (appreciably heavier than the spring 43) encircles the rod 50, said spring bearing at one end against the nut 49 and at its other end upon the flange or collar 51. The normal tendency of the spring 52 is therefore to press the valve 45 toward its seat and (through the medium of the rod 46) to move the valve 36 and the disk 41 from their seats toward which they are pressed by spring 43.

With the parts in the position shown in Fig. 2, fluid under main reservoir pressure is operating to maintain the switch 4 closed and the pump is therefore operating to raise the pressure in the main reservoir to what may, for convenience, be termed "standard" or "working" pressure. Now let it be assumed that this pressure in the main reservoir has been acquired, so that the pump should not be permitted to continue its operation to force fluid thereinto; under these conditions the operation of the governor will be as follows: The main reservoir pressure, now having reached the predetermined maximum degree and having access to the chamber 31, under valve 45, (through the ducts 29—27—35 and 32 and also through the ducts 29—27—26—25 and 30) is sufficient with the assistance of spring 43 (through the medium of the valve 36 and rod 46) to overcome the resistance of the spring 52 and thus raise the valve 45 a slight distance from its seat. As soon as this occurs, the pressure in chambers 31 and 34 (which are freely connected by the ducts 35—26—25 and 30, leading through chamber 17 and by the duct 32) will drop slightly by reason of the passage of fluid from said chamber to the atmosphere past valve 45 and through the ducts 12 and 11. This reduced pressure thus acting simultaneously on the upper face of the large valve 36 (which has a much greater area than the valve 45) and on the lower face of the small valve 45 will act to produce a rapid upward movement of both valves together, for the lower face of valve 36 is at all times freely exposed to main reservoir pressure (through the ports 42) and obviously any reduction of pressure between the two valves will have the effect of increasing the total upward force tending to move said valves. Thus it will be seen that the valve 36 will quickly be forced to its seat and the valve 45 held from its seat. During this movement and before the valve 36 is seated, the disk 41 is pressed on the lower end of the sleeve 28 by the spring 43, thus closing the port 27 and preventing a further flow of air to the chamber 17, 31 and 34. The pressure of the spring 43 is thus removed from the valve 36 and the upward motion of the latter is now caused only by the main reservoir pressure acting on its lower face as previously pointed out. It is also important to note, that, although at this time the spring 43 no longer assists the upward motion of the valve, the area of valve 36 is sufficiently large as compared to that of valve 45 to insure the continuance of this motion by the action of the fluid pressure alone.

Thus it is seen, from the foregoing explanation, that in a very brief period of time (after the main reservoir pressure has reached its desired maximum value) the valve 36 is seated, the valve 45 held from its seat and the port 27 is closed, and consequently there is no way for fluid under pressure to enter the chambers 17, 34 and 31 (except by leakage around the piston 16 and the valve 36, both of which, however, closely fit their cylinders) and these chambers being freely open to the atmosphere (valve 45 being off of its seat) by way of the ducts 12 and 11, it is obvious that the pressure in these chambers will rapidly fall to a very low degree; consequently the main reservoir pressure acting on the left hand portion of the piston 16 will force it rapidly from the position shown in Fig. 2, to the right hand end of its cylinder, when it seats on the seat 19, thus preventing any air which may leak by the piston packing from escaping to the atmosphere through ducts 30—12 and 11. This motion of the piston 16 to the right will of course open the switch 4 and thus stop the pump. As the piston 16 moves to the right, the air in the chamber 17 and any air leaking by the piston 16 will pass out to the atmosphere through the ducts 30, 12 and 11, the ducts 11 being so located that the air thus passing from them will be directed against the electric arc which may form between the members 10 and 6 (when they are separated from each other) and thus cause the blowing out or extinction of such an arc. The motion of the piston 16 to the right also establishes free communication between the ports 24 and 25 through the chamber 17, (the piston 16 moving beyond the port 25), this free connection of ports 24 and 25 playing an important part in the operation of the mechanism during the closing of the switch 4.

Now it is obvious that the various valves and parts of the mechanism will remain in the positions just described as long as the main reservoir pressure acting on the lower face of valve 36 (the upper face of this valve being exposed to atmospheric pressure existing in the chamber 34 which is connected by duct 32, chamber 31 and ducts 12—11 to the atmosphere) is of a sufficiently high degree to overcome the tension of the spring 52 (the valve 45 now being subjected on both faces to atmospheric pressure) acting through the medium of the valve 45 and rod 46 on the valve 36 and tending to unseat the latter. When however, the main reservoir pressure is no longer able to thus hold the valve 36 on its seat against the tension of the spring 52, the valve 36 will be moved downwardly a slight distance, and air from the main reservoir passing freely through the duct 24, chamber 17, port 25 and ducts 26 and 35 will flow rapidly into chamber 34 from which it can only escape through the restricted duct 32; consequently the valve 36 becomes practically balanced at once and the spring 52 thus rapidly moves it and valve 45 to the position shown in Fig. 2, thus moving the disk 41 opening port 27 taking up the tension of the spring 43,— also closing chamber 31 from the atmosphere by seating valve 45. Fluid under main reservoir pressure now being admitted to chamber 17 behind piston 16, (through the ducts and chambers, 30—31—32—34—35—27—38—29 and 21) the latter will be forced toward the position shown in Fig. 2, because of the fact that the portions of the left hand face of the piston occupied by the rod 13 is subject to atmospheric pressure whereas the whole of the right hand face of the piston is subjected to main reservoir pressure by the means just described. When the piston 16 passes port 25 in its motion to the left, supply air is admitted behind it through this port and duct 26 as well as through duct 30. The opening of this additional passage permits of a very rapid closing of the switch the duct 27 not being restricted in any way, which of course is desirable to prevent the burning of the contacts.

It will be observed that when the switch is open and valve 36 is on its seat, the pressure, at which the switch will close, is fixed by the tension of spring 52 alone (as at this time the tension of spring 43 is not acting on valve 36) consequently the point at which it is desired to have the switch close may be fixed by the proper adjustment of spring 52 by means of the nut 49. Also the area of valve 36 is so much greater than that of valve 45, that if the main reservoir pressure alone were required to lift valve 45 from its seat there would be more than the ordinary difference between the points at which the switch would be caused to open and close, consequently by adjusting spring 43 to the proper tension by means of nut 40 the pressure at which the switch will be opened can be fixed at any desired point within a certain range which obviously depends on the relative areas of the valves 45 and 36, on their lift and on the stiffness of the spring 52. Thus it is clear that having set the governor to start the pump (by closing the switch 4) at any desired pressure, by the adjustment of spring 52, the point at which the pump will be stopped (by the opening of the switch 4) may be fixed by means of the spring 43 without in any way changing or affecting the means controlling the point at which the switch is closed.

It is evident that instead of opening and closing a switch to control an electric motor, the rod of piston 16 may be made to operate a suitable valve mechanism to control a steam or other motor which might be employed for operating the pump or compressor. It is also to be understood that while I have described my improvements in connection with an air brake system, it is evident that said improvements may be employed with any apparatus where it is desired to maintain a predetermined fluid pressure in a storage reservoir.

Various changes might be made in the details of construction of my invention without departing from the spirit thereof or limiting its scope and hence I do not wish to limit myself to the precise details shown and described.

Having fully described my invention what I claim as new and desire to secure by Letters-Patent, is:—

1. A pressure governor for pumps comprising a pump controlling device, a movable abutment for actuating said controlling device, means governed by the pump pressure for controlling said abutment, a spring for regulating the cutting-in point, and an additional spring adapted to oppose the first spring for regulating the cutting-out point of the governor.

2. A pressure governor for pumps comprising a pump controlling device, a movable abutment for operating same, a piston valve mechanism subject to pump pressure for controlling the fluid pressure for operating said movable abutment, an adjustable spring acting on said valve mechanism for regulating the cutting-in point and a second adjustable spring adapted to modify the action of the first spring to regulate the cutting-out point of the governor.

3. A pressure governor for pumps comprising a pump controlling device, a movable abutment for operating same, a piston valve mechanism subject to pump pressure for controlling the fluid pressure for operating said movable abutment, an adjustable spring acting on said valve mechanism for regulating the cutting-in point and a second adjustable spring acting on said valve mechanism to regulate the cutting-out point of the governor and means for preventing said second spring from acting in the cut-out position of the valve mechanism.

4. In an apparatus of the character described, the combination with a casing having a controlling chamber therein, a piston in said chamber, and means connected with said piston for controlling the operation of a pump, of means for introducing reservoir pressure into the controlling chamber in front of the piston, a valve for controlling the passage of fluid under reservoir pressure to the controlling chamber in front of the piston therein, a valve for controlling the exhaust from the controlling chamber in front of the piston, a spring tending to seat said exhaust valve, means for adjusting the tension of spring, a rigid connection between said valves, and means for admitting fluid pressure between said valves.

5. In an apparatus of the character described, the combination with a casing having a controlling chamber therein, a piston in said chamber and means connected with said piston for controlling the operation of a pump, of means for introducing reservoir pressure into said controlling chamber in front of the piston therein, a valve for controlling exhaust of pressure from the controlling chamber in front of the piston, an adjustable spring opposing the unseating of said valve, a valve for controlling the admission of fluid under reservoir pressure into the controlling chamber in front of the piston therein, said last-mentioned valve having a greater exposed surface area than that of the exhaust valve, means for introducing fluid pressure between said valves, and a rigid connection between said valves, whereby the seating of one will unseat the other.

6. In an apparatus of the character described, the combination with a casing having a controlling chamber therein, a piston in said chamber, and means connected with said piston for controlling the operation of a pump, of means for introducing reservoir pressure into the controlling chamber in front of the piston, a valve for controlling the exhaust of pressure from the controlling chamber in front of the piston, an adjustable spring opposing the unseating of said valve, a valve for controlling the admission of fluid under reservoir pressure into the controlling chamber in front of the piston therein, means controlled by the operation of said valves for exposing the space between them to atmospheric pressure, and a rigid connection between said valves, whereby the seating of one of said valves will unseat the other.

7. A pressure governor comprising a controlling device, a movable abutment normally subject on one side to fluid under pressure and on the opposite side to fluid under pressure and to the atmospheric pressure, for actuating said controlling device, adjustable springs and means governed by pump pressure and the pressure of said adjustable springs for controlling the fluid pressure for operating said abutment.

8. A pressure governor comprising a controlling device, a movable abutment for actuating said controlling device, and means subject in one direction to the pressure of a spring and in the opposite direction to the pressure of another spring and pump pressure for controlling the fluid pressure on said movable abutment.

9. A pressure governor comprising a controlling device, a movable abutment for actuating said controlling device, a differential piston device subject to pump pressure tending to move same in one direction, and opposing springs adapted to act in opposite directions on said piston device for controlling the movement of said movable abutment.

In testimony whereof, I have signed this specification in the presence of two subscribing witnesses.

HOWARD M. P. MURPHY.

Witnesses:
A. N. MITCHELL,
R. S. FERGUSON.